United States Patent
Layton et al.

(10) Patent No.: US 6,829,478 B1
(45) Date of Patent: Dec. 7, 2004

(54) INFORMATION MANAGEMENT NETWORK FOR AUTOMATED DELIVERY OF ALARM NOTIFICATIONS AND OTHER INFORMATION

(76) Inventors: Pamela G. Layton, 26 Longmeadow Dr., Westwood, MA (US) 02090; Keith D. Crawford, 67 Tanglewood Rd., Newton, MA (US) 02459; Jeffrey A. Gadboys, 3715 Veylon Dr., Gulf Breeze, FL (US) 32501; Jack H. Jacobs, 101 Oaks Rd., Millington, NJ (US) 07946

( * ) Notice: Subject to any disclaimer, the term of this patent is extended or adjusted under 35 U.S.C. 154(b) by 746 days.

(21) Appl. No.: 09/714,841

(22) Filed: Nov. 16, 2000

Related U.S. Application Data
(60) Provisional application No. 60/166,585, filed on Nov. 19, 1999, and provisional application No. 60/232,340, filed on Sep. 14, 2000.

(51) Int. Cl.$^7$ .............................................. H04Q 7/20
(52) U.S. Cl. ...................... 455/428; 455/414; 455/420; 370/242; 370/244
(58) Field of Search .............................. 455/426.2, 428, 455/426.1, 418, 419, 420, 432, 404.1, 414, 424; 370/244, 242, 243

(56) References Cited

U.S. PATENT DOCUMENTS

| | | | |
|---|---|---|---|
| 5,201,067 A | 4/1993 | Grube et al. ................... 455/89 |
| 5,329,578 A | 7/1994 | Brennan ....................... 379/67 |
| 5,604,791 A | 2/1997 | Lee ............................... 379/67 |
| 5,745,849 A | 4/1998 | Britton ....................... 455/404 |
| 5,752,976 A | 5/1998 | Duffin et al. .................. 607/32 |
| 5,802,467 A | 9/1998 | Salazar et al. .............. 455/420 |
| 5,809,118 A | 9/1998 | Carmello et al. ...... 379/102.02 |
| 5,827,180 A | 10/1998 | Goodman ................... 600/300 |
| 5,845,207 A | 12/1998 | Amin ......................... 455/414 |
| 5,897,493 A | 4/1999 | Brown ....................... 600/300 |
| 5,923,731 A | 7/1999 | McClure ....................... 349/33 |
| 5,946,386 A | 8/1999 | Rogers ........................ 379/265 |
| 5,957,854 A | 9/1999 | Besson ........................ 600/509 |
| 5,978,688 A | 11/1999 | Mullins et al. ............. 455/557 |
| 6,125,282 A | 9/2000 | Urabe ......................... 455/552 |
| 6,131,040 A | 10/2000 | Knuutila et al. ............ 455/550 |
| 6,223,030 B1 | 4/2001 | Van Den Heuvel ......... 455/422 |
| 6,285,868 B1 * | 9/2001 | LaDue ........................ 455/410 |
| 6,411,802 B1 * | 6/2002 | Cardina et al. ............. 455/424 |
| 6,473,407 B1 * | 10/2002 | Ditmer et al. .............. 370/252 |
| 6,473,411 B1 * | 10/2002 | Kumaki et al. ............. 370/331 |
| 6,587,457 B1 * | 7/2003 | Mikkonen ................... 370/356 |
| 6,687,222 B1 * | 2/2004 | Albert et al. ............... 370/230 |

OTHER PUBLICATIONS

Bigioi et al., "Transparent, Dynamically Configurable RF Network Suitable for Home Automation Applications," *IEEE Transactions on Consumer Electronics*, vol. 45, No. 3, pp. 474–480 (Aug. 1999).

Digital Security Controls, Ltd., datasheet on AFT–100 Glass Break Detector (3 pp. Nov. 2000).

Digital Security Controls, Ltd., datasheet on WLS906 Photoelectric Smoke Alarm (3 pp. Nov. 2000).

Digital Security Controls, Ltd., datasheet on WLS908 Panic Pendant, (2 pp. Nov. 2000).

(List continued on next page.)

*Primary Examiner*—Cong Van Tran
(74) *Attorney, Agent, or Firm*—Burns & Levinson LLP; Frederick C. Williams; Yan Lan (57) ABSTRACT

A remote Information Management Network routing system located either at an independent hosting facility or at a central station monitoring facility that receives event and alert information from a security or premise monitoring system and sequentially transmits interactive notifications about the event and alert information to wired and wireless devices specified in a user profile within the Information Management Network.

18 Claims, 4 Drawing Sheets

OTHER PUBLICATIONS

ITI Technologies, "About ITI Technologies" and datasheets on models 60–460–319.5, 60–652–95, 60–742–95R, 60–744–95 (Nov. 2000, North St. Paul, MN).

Linear Corp., "About Us " (3 pp., 2000) and "DXS Supervised Transmitters" (1 p., 2000).

Linear Corp., DXS–31 Supervised Door/Window Sensor (1 p., Carlsbad, CA, USA, © 1998).

Linear Corp., DXS–54 Supervised Passive Infrared Motion Detector (1 p., © 1998).

Linear Corp., DXS–72 Supervised Photoelectrnic Smoke Detector (1 p., © 2001).

Linear Corp., DXT–91 Glass Break (1 p., © 1998).

Microchip, Inc. webpage on PIC16C77 alarm processor (updated Sep. 26, 2000, Chandler, AZ, USA).

Motorola, Inc. datasheet on MC68HC05 telephone processor (Schaumburg, IL, Nov. 1, 2000).

Motorola, Inc., datasheet on MC13145 receiver (Schaumburg, IL, Nov. 1, 2000).

Motorola, Inc. datasheet on MC13146 transmitter (Schaumburg, IL, Nov. 1, 2000).

* cited by examiner

INFORMATION MANAGEMENT NETWORK FOR AUTOMATED DELIVERY OF ALARM NOTIFICATIONS AND OTHER INFORMATION

PRIORITY

This application claims priority from U.S. Provisional Applications Ser. No. 60/166,585, filed Nov. 19, 1999, and Ser. No. 60/232,340, filed Sep. 14, 2000, and incorporates both by reference herein as though fully set forth herein.

FIELD OF THE INVENTION

This invention relates generally to security and monitoring systems for both residential as well as business and industrial use. It relates more particularly to security and monitoring systems that operate over wired or wireless networks. Even more particularly, it relates to security and information systems that use condition sensors connected by a network that facilitates remote monitoring, notification, and interaction.

BACKGROUND OF THE INVENTION

Existing premises security monitoring systems are usually connected to central monitoring stations via the public switched telephone network (PSTN) or a by a commercial wireless network. In the event of a system alert, current monitoring center procedures provide the customer with an alarm verification call, notification to the local police or fire authorities, and notification to a number of designated contact numbers. Although only 20% of the households in this country have monitored security systems, false-alarm police dispatches account for 98% of police dispatches nationwide. Such false alarm events typically cost municipalities nationwide over $1.5 billion per year. As a result of the high incidence of false alarms plaguing the industry, it is not uncommon for the police to take as long as an hour to reach the premises where an alarm has been activated.

Further, when an alarm system is violated, the siren only sounds for a period of up to five minutes. Should the homeowner return to the premises before the police arrive and after the alarm ceases, the safety of that individual is seriously compromised.

In the residential security system industry today, upon the receipt of an alarm transmission from a security or premises monitoring system, the dispatcher of the central station monitoring facility calls the premises to verify whether the emergency event is valid. If there is no answer or if it is otherwise deemed necessary, the dispatcher notifies the appropriate authority for emergency dispatch. At the time of emergency notification, the dispatcher at the central station monitoring facility is limited to the information transmitted from the base unit in the premises. The dispatcher does not have access to real-time information about the situation that could influence his decision as to whether to notify the emergency authority.

Furthermore, the calls made to the customer contacts after the authorities are dispatched are most typically not given priority by the central station monitoring facilities and are only made to the customer contacts when emergency calls and dispatches for other customers are not being made. Therefore, it is not uncommon for the contacts listed in the customer file to be notified about the alarm so long after the incident that notification is useless.

When the central station monitoring facility calls the premises to verify the alarm event, if the event notification is not cancelled, the dispatcher immediately notifies the emergency authorities for dispatch to the premises in question. If the homeowner is not at home at the time of the alarm event, the homeowner's knowledge of the premises, hardware and authorized users is not available to influence or control the action taken by the central station monitoring facility at the time of alarm signal transmission. And, it is only after the emergency authorities have been dispatched that the dispatcher of the central station monitoring facility attempts to notify the other contacts listed in the customer's file.

Current systems also allow customers limited or no opportunities to alter contact numbers in their profiles or to be contacted via the growing variety of communication devices available to the public (e.g., fax, e-mail, pager, Personal Digital Assistant (PDA), text messaging device). It is therefore generally uncommon for the contact numbers stored in the customer's contact list to be up-to-date due to the cumbersome process required to update a contact list.

These factors seriously compromise the safety of the owner of the premises, who, if not on premises at the time of the alarm event, may not receive information about the alarm notification prior to entering the premises while an intruder is still present. The above factors also contribute to the high incidence of false alarm dispatches in this country. If the owner of the premises is not on the premises at the time of the alarm event, the owner is not able to direct the central station monitoring facility whether to cancel or continue with authority dispatch.

The current call flow process from a security or premises monitoring system direct to a Central Monitoring Station, which calls the premises for verification and then notifies the authority for emergency dispatch, is an inefficient premises monitoring solution. This call flow configuration also has adverse cost and safety implications for the system owner, central station monitoring facilities, authorities, and cities alike.

It is therefore an object of the invention to provide an improved system for monitoring premises security and other conditions. It is a primary object of this invention to provide a system that transmits interactive notifications about premises event and alert information in the order and manner determined by the customer within the customer profile to any wired or wireless communication device. It is yet a further object of this invention to receive transmissions of alarm notifications regarding changes in the status of any one of a number of sensors or parameters in a security or premises monitoring system at a remote Information Management Network via the Public Switched Telephone Network, Wireless Commercial Network, cable network or other commercial network.

It is another object of the present invention that the customer be able to remotely and securely access the Information Management Network via the Internet or telephone to modify and review the information in his Customer Profile and Event Log within the Information Management Network, using a secure web or telephone interface, to easily and securely maintain and update contact lists and notification preference points, schedule times for certain information notifications, update call flow sequences, access personal account information, review detailed alarm history, review results of notifications made to each of the delineated devices, review billing information, schedule non-alarm event notifications and update and review other alarm signal and hardware related information. It is another object of the invention that the Information Management Network initiate periodic interactive notifications to customers to encourage them to update their Customer Profile by entering the correct digital or voice recognized pass code.

It is yet a further object of the invention that the customer be able to determine the order in which contacts will receive the event transmission and have the opportunity to cancel said event transmission prior to said transmission being sent to the central station monitoring facility or private guard service for authority dispatch. It is another object of the present invention that an authorized recipient of an event notification can cancel the transmission of the notification to the subsequent contacts in the notification sequence or a central station by entering the correct digital or voice recognized pass code. It is yet another object of this invention that a central station monitoring facility use the Information Management Network to contact customer devices listed in the Customer Profile concurrently or following the dispatcher's verification call to the home, to allow an authorized individual, remote from the premises, to cancel the alarm notification prior to dispatch of the authorities. It is still another object of the invention that the recipient of a notification call be able to be transferred or conferenced with the emergency authority through a digital or voice request. It is another object of the invention that the receipt of information by the recipient can be confirmed and a record kept in the event log database of the Information Management Network for retrieval and review at a later date by an authorized individual. It is another object of the invention that the Information Management Network complement or replace the functions of a central station monitoring facility.

SUMMARY OF THE INVENTION

The system of the current invention provides to users and central station monitoring facilities an efficient and affordable event notification solution in which the call flow configuration of the invention is designed to enhance the safety and convenience of the customer and reduce the incidence of police, fire, or other emergency dispatches generated by false alarms. The invention comprises a secure interactive and remotely accessible Information Management Network (IMN) based routing system for alert, medical, and other emergency event information. The system delivers sequential interactive event notifications based on signals received from sensors at the monitored premises and sends them in text, voice, DTMF or digital, text messaging, or other formats to a plurality of remote wired and wireless devices, including cell phone, pager, email, SMS, landline phone, text messaging device, personal digital assistant, and fax as appropriate. The IMN further delivers such notifications to a pre-designated central station monitoring facility in security industry format.

The hardware of the IMN is a combination of a plurality of modems, an alarm monitoring engine, at least one server containing customer information databases, a unified messaging platform, event logs, web and telephony interfaces, an interactive messaging server, a Private Branch Exchange/Interactive Voice Response (PBX/IVR) interface, and a telephone conferencing switching mechanism. This configuration translates the data received from a premises hardware unit into a notification capable of being sent in voice or text format to any number of customer designated devices including telephone, fax, email addresses, pager, Personal Digital Assistant (PDA), or text messaging device. The systems are redundant.

The IMN routing system is domiciled at a secure independent hosting facility or at a secure central station monitoring facility. The system is able to receive event and alert information from any security or premises monitoring devices and sequentially transmit interactive notifications about the event and alert to wired and wireless communications devices specified in the Customer's Profile within the IMN. Transmissions can be made in voice, text, DTMF, digital, text messaging or other formats to such devices as cell phone, pager, email, fax, text message device and SMS, as well as in Contact ID, SIA, or other security industry formats to an independent central station monitoring facility for them in turn to dispatch the authorities.

The automated secure remote IMN has a novel interactive alarm notification call flow sequence that uses information stored in the Customer Profile within the database of the IMN to notify designated points of contact by making sequential interactive notifications to one or more persons or locations previously designated in the Customer Profile over one or more wired and wireless devices in text, voice, DTMS, text messaging or digital formats to notify them of an emergency event or a change in the status of any premises sensors. Delivery to any of the above destinations occurs in the order and manner specified in the authorized user's Customer Profile within the IMN.

For an alarm notification, the information conveyed can include the customer name, address, location of the security or premises hardware, phone number of the security or premises hardware, date, time, type and name of sensor, zone, local emergency authority phone number, and other relevant personal or premises-related information. The IMN also allows for a two-way communication interface with the security or premises hardware.

The IMN, having automatically received an alert notification from the premises where the monitoring devices are located, automatically accesses a data base, finds the particular owner's profile, and then also automatically sends interactive alert messages to phones, faxes, email devices, pagers, hand-held computers and/or a manned monitoring center as previously specified by the owner. The use of the alarm system is electronically logged in the IMN so that it can be reviewed later.

The system uses the information populated within the Customer Profile to instantly alert the customer and his contacts of the alarm event, for example, to warm them of an intruder on the premises or to alert them to another type of emergency event at the premises and enable them to make a decision as to whether the emergency authorities should be notified by the customer directly or through a central station monitoring facility or guard service, or the event notification should be cancelled.

The user can securely access the IMN via the Internet or telephone to program or re-program the user's customer profile, to include notification preference points, ordering of notifications, routing paths for different types of notifications, times for notification and other related information. This access is to a single universal access point. Receipt of information by the user can be confirmed and a record kept in the event log database of the IMN for retrieval at a later date by an authorized user.

The IMN also permits the user to modify the pre-existing premises alarm notification call flow sequence by allowing the user to direct and manage the alarm notification process. Event notifications from the IMN are interactive and made sequentially to the contacts designated in the Customer's Profile, allowing the recipient of the event notification to determine the next action to be taken by the IMN in the call flow sequence. Authorized recipients are able to terminate or redirect subsequent event notifications by entering the correct pass codes digitally or through voice recognition technology.

Customers can select the number and ordering of contacts to be notified and queried prior to alarm event transmissions being sent to the central station monitoring facility for emergency authority dispatch. Customers can select to have a central station monitoring facility as part of the call flow sequence, or have notifications sent only to the contacts listed in their profile for those contacts to notify emergency authority for dispatch. Authorized users can access their Customer Profile via a pass code encrypted telephone or Internet interface, to change alarm system configuration, update their points of contact, establish the order in which contacts will be notified based on the type of alarm event and review emergency information any time they desired. Using the pass code accessible Internet and telephone interfaces, users can access information about their accounts, including billing information, contact points, pass code information and alarm history. The invention also provides for externally specified and changeable control of alarm system operation and home automation devices via the IMN or from a remote telephone. Externally directed control of alarm system operation and home automation devices takes place via the IMN.

The ability to securely and easily update contact information at anytime and from anywhere allows the customer to be part of and closely manage the security notification call flow process and enhance his safety by directing alarm event notifications to contact him on specified devices early on in the event notification process. This feature, coupled with the user's ability to cancel an alarm notification prior to its being sent to the central station monitoring facility, influences the call flow sequence of alarm event information and reduces the incidence of false alarm dispatches. Authorized contact recipients are identified with user-determined pass codes, verified by a digital pin number or Voice Recognition pin number, prior to that person instructing the IMN as to the next step or steps of action to be taken in the call sequence. Another important feature is the logging of event notification information into the database of the IMN so that the customer can review it at a later date.

In this system users have direct, secure access to the monitoring network database via phone or the global computer network in order to review and change alarm system configuration, points of contact and emergency information any time they desire. Customers have access to securely manipulate their personal information within their Customer Profile over the telephone or through a web interface, 24 hours a day.

Customers can elect to have central station monitoring facility back-up capability to be employed after one or more contacts listed in the Customer's Profile have been contacted and queried, and have failed to receive or respond correctly to the interrogation from the IMN. Customers can also elect not to have a central station monitoring facility as part of the call flow sequence and have the notifications sent only to the contacts listed in their Customer Profile. In all notification calls, customers are provided the opportunity to be transferred directly to the emergency authority for them to initiate a dispatch to the premises.

In certain instances, customers can select to have a central station monitoring facility or guard service notified for police or emergency dispatch, after one or more of the contacts listed in the Customer Profile have received the information and have either failed to properly cancel the event notification or have proactively instructed the IMN to contact the central station monitoring facility or guard service for dispatch. At the same time, recipients of alarm and event notifications are provided the local police number, as well as the ability to be transferred or conferenced with the local police or emergency authority.

Through the IMN, customers can also subscribe to receive notifications with content not related to the security or premises hardware. Such notifications include medication reminders, homeland security notifications and news events, transmitted at specific times, on specific dates, or under specific circumstances, and transmitted to a plurality of wired and wireless devices in text and voice formats as designated in the customer profile.

DETAILED DESCRIPTION OF THE PREFERRED EMBODIMENTS

A Security or Premises Monitoring System has been previously described in the parent application, which has been incorporated by reference. The Security or Premises Monitoring System is connected by a communications circuit, which can be any of or a combination of elements selected from the public switched telephone network, a wireless network, digital subscriber line via modem, cable modem connected to a cable network, the internet, and any other communications network capable of transmitting dual tone multiple frequency tones or their equivalent. The Security or Premises Monitoring System connects on demand to the Information Monitoring Network (IMN) of this invention, described below.

With respect to hardware, the IMN comprises at least a DTMF modem, an application interface, at least one server containing customer information databases, a unified messaging platform, an event log, a web interface, and a telephony interchange, such as a Private Branch Exchange/Interactive Voice Response (PBX/IVR) interface. (See FIG. 3). The at least one server comprises a server type computer the nature and configuration of which is well known to those skilled in the art. Those skilled in the art will also recognize that the network of this invention can be implemented with a variety of computing and communications hardware differing from those explicitly disclosed in this application but well known to those skilled in the art.

The hardware and software configuration translates the DTMF tones received from the Security or Premises Monitoring System into a message capable of being sent in voice or text format. As the following will describe, the IMN enables sending the message to any number of customer designated devices including telephone, fax, email addresses, pager, or Personal Digital Assistant (PDA) such as a PALM PILOT.

Figure 1:
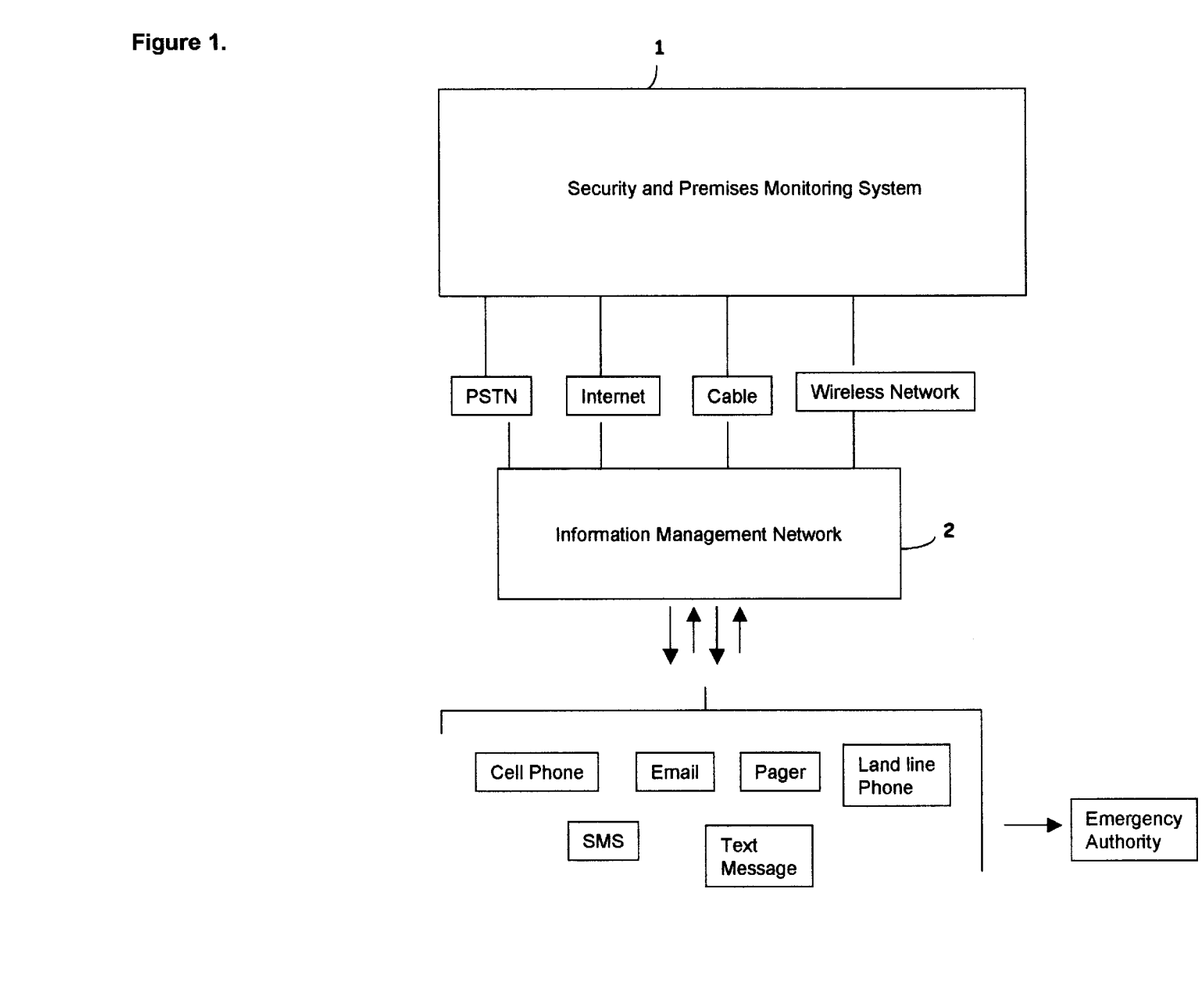
FIG. 1 is a diagram of the communication flow established by the Information Management Network.

Referring to FIG. 1, alarm or event information is sent from the Security or Premises Monitoring System 1 to the remote Information Management Network 2 via any type of communication channel. The system retrieves user information and alert notification addresses (including but not limited to phone numbers, fax numbers email addresses, pager numbers, and Personal Digital Assistant device addresses) from the customer database and, as described in more detail below, forwards the alarm notification or medical information to the designated points of contact, simultaneously or sequentially. For an alarm notification, the information conveyed includes the customer name, location of the base unit, phone number of base unit, date, time, type of sensor and zone.

Interactive notifications are then sent from the Information Management Network to the contacts listed in the Customer Profile 17 (shown in FIG. 3) via at least one communication device, including cell phone, pager, email, SMS, landline phone, fax or text messaging device. Contact recipients of the interactive alert notifications are provided the option to cancel the event notification by providing a correct pass code using digital entry or voice recognition technology; send the alert notification to the next contact in the Customer Profile 17, or be transferred to or conferenced with the local emergency authority. There is no central station monitoring facility associated with the call flow sequence of FIG. 1.

Figure 2:
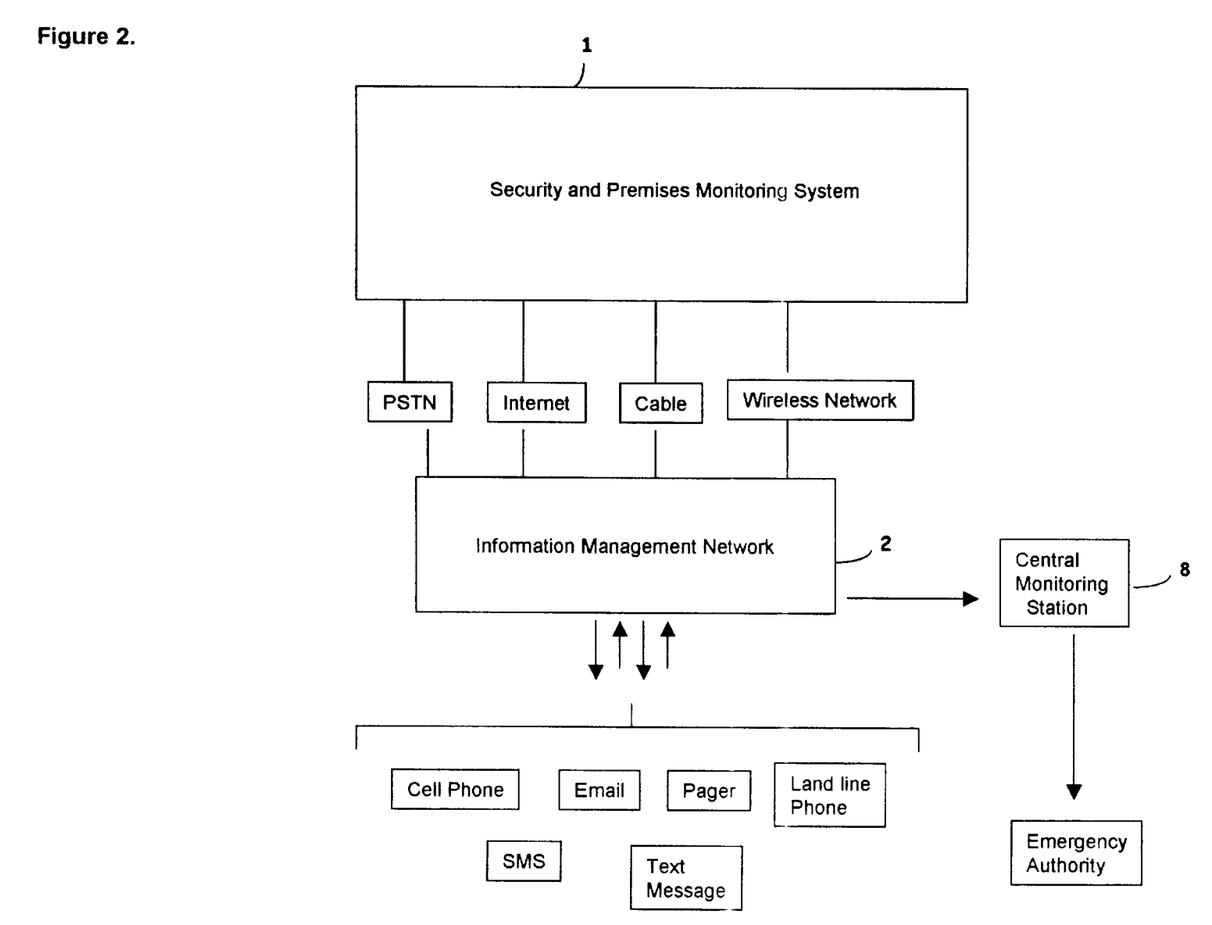
FIG. 2 is a diagram of the communication established by the Information Management Network including the central station monitoring facility or private guard service, the police, or other emergency authority.

Referring to FIG. 2, alarm or event information is sent from the Security or Premises Monitoring System 1 to the remote Information Management Network 2 via any communication channel including the Public Switched Telephone Network, the Internet, Cable or a Wireless Network. Interactive notifications are then sent to the contacts by the Information Management Network listed in the Customer Profile 17 (shown in FIG. 3) via any number of communication devices including cell phone, pager, email, SMS, landline phone, fax or text messaging device. Contact recipients of the interactive alert notification are provided the option to: cancel the event notification by providing the correct pass code using digital or voice recognition technology; send the alert notification to the next contact in the Customer Profile 17; send the alert notification to the central station monitoring facility. In this configuration, the central monitoring station is generally responsible for police and emergency authority notification for dispatch, but optionally the responder can be transferred to or conferenced with the local emergency authority.

Figure 3:
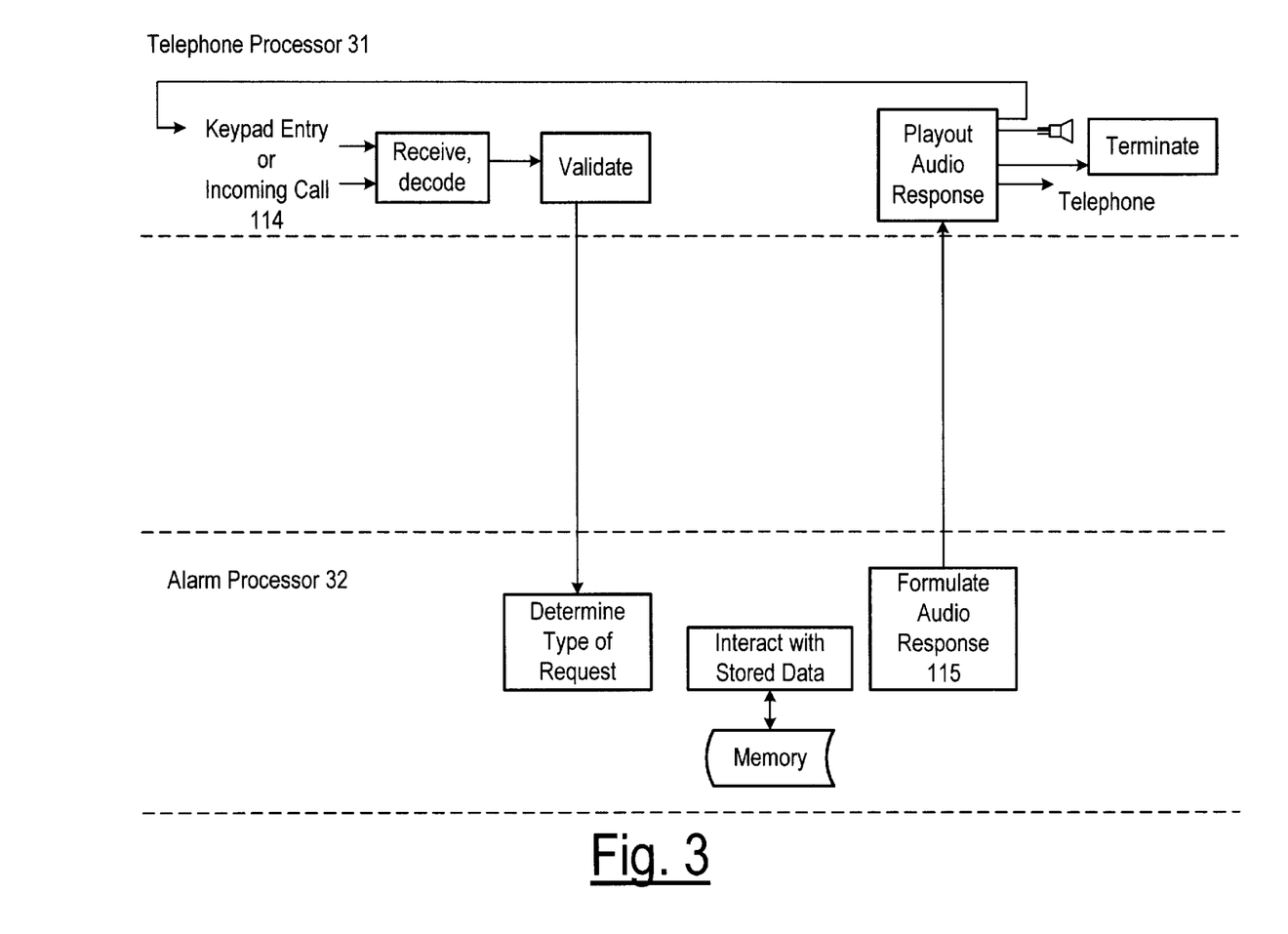
FIG. 3 is a schematic diagram depicting the hardware components of the Information Management Network and the communications portals into and out of the Information Management Network.

Referring to FIG. 3, information sent from the Security or Premises Monitoring System 1 to the Information Management Network 2 enters the Information Management Network 2 through the Telephony Server 11, Cable Modem 12 or IP Server 14. Alarm information then flows through the Alarm Monitoring Engine 15 to the Database Server 16. Information regarding the specific account is stored in the Customer Profile 17 within the Database Server 16 that provides the work flow process for each alarm event. All alarm notification events are sent by the Interactive Messaging Server 18 to the customer contacts via landline phone, cell phone, text messaging device, pager, email, fax or SMS. The Interactive Messaging Server 18 can interrogate the contact recipient of the alarm notification for information and institute the appropriate work flow process based on the response of that contact. The results of all work flow processes are stored the Event Log 19 and can be reviewed by authorized individuals through the Telephony Interface into the Telephony Server 11 or the Web Interface through the Web Server 20. During a notification, customers are provided the option to be connected to the police phone number listed in their Customer Profile 17 within the Database Server 16. This connection is made through the Telephone Conference Switching Mechanism 21. Alarm notifications associated with central station monitored accounts are transmitted from the Database Server 16 to the central station monitoring facility via the Interactive Messaging Server 18 following the call flow sequence designated in the Customer Profile 17. Access to the Customer Profile 17 and changes to said Customer Profile 17 are made through the Telephony Server 11, Customer Service Receiver 22 and Web Server 20 into the Information Management Network 2.

Figure 4:
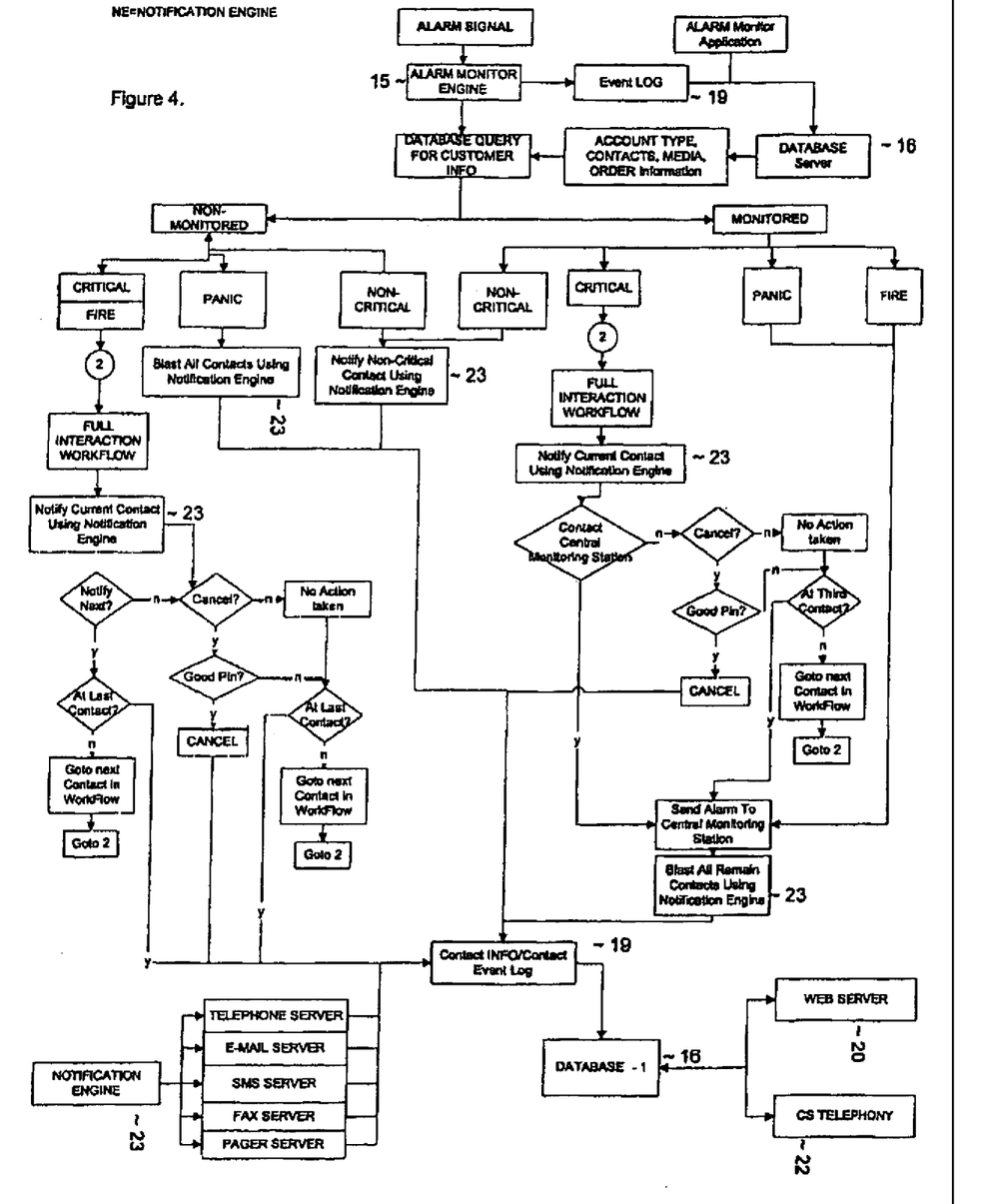
FIG. 4 is a flow diagram illustrating the work flow process within the Information Management Network.

Referring to FIG. 4, the call flow processes are detailed for an alarm event. When the incoming signal is received by the Information Management Network 2, the signal enters the Alarm Monitoring Engine 15 and is immediately logged into the Event Log 19 within the Database Server 16. The alarm notification string is parsed to determine information about the account. Using the customer identification number, the Customer Profile 17 within the Database Server 16 is queried for the alarm type and customer account information for the work flow processes.

For a central station monitored account, there are different workflows associated with non-critical, critical, panic, and fire events. In the event of a non-critical alarm, which represents a low battery event, AC Power loss or other non-critical event, the alarm event information is sent by the Notification Engine 23 within the Interactive Messaging Server 18 to the customer's non-critical contact on the device specified in the Customer's Profile 17. The results of this notification are stored in the Event Log 19 within the Database Server 16. In the event of a critical alarm, the information is sent to the customer's first contact using the Notification Engine 23 within the Interactive Messaging Server 18. The contact is given the option to cancel the alarm or send the signal to the central station monitoring facility 8 for dispatch.

If the contact request's that the central station monitoring facility 8 be notified for the dispatch of the authorities, the Notification Engine within the Interactive Messaging Server 18 sends the alarm transmission to the central monitoring station 8 for authority dispatch and the results of the work flow process are stored in the Event Log 19. All other contacts listed in the Customer's Profile 17 are then notified that alarm event notification was sent to the central station monitoring facility 8.

If the alarm notification information is sent to a device where the contact chooses to cancel the alarm event, the customer's notification cancel code is requested. If the correct alarm notification cancel code is entered, the alarm notification event and work flow process are cancelled and the information of the work flow process is stored in the Event Log 19.

If the incorrect alarm notification cancel code is entered, the customer is requested to re-enter the code. If an invalid alarm notification cancel code is entered second time, or no code is entered, the work flow process moves to the next contact listed in the Customer's Profile 17 and the notification process is repeated. When the second contact is notified, if there is no answer, an invalid cancellation code is entered or the contact selects to have the central station monitoring facility 8 notified, the alarm event is sent to the central station monitoring facility 8 for authority dispatch and the information is stored in the Event Log 19. In any case where a valid alarm notification cancel code is entered, the notification event and the workflow process are cancelled, and the information regarding the cancellation of the alarm event notification is stored in the Event Log 19. In any case where the central station monitoring facility 8 is notified for dispatch, all remaining contacts are notified that the alarm event was sent to the central station monitoring facility 8 and the information is then stored in the Event Log 19. When an alarm notification is sent, if the notification is unable to be delivered by the Information Management Network 2, if the line is busy or there is no answer by the first contact listed in the Customer Profile 17, the workflow process moves to the next contact listed in the Customer Profile 17.

If the first contact is answered by a voice mail or answering machine, the Notification Engine 23 within the Interactive Messaging Server 18 recognizes that it is not a live person, leaves a message and the work flow process moves to the next contact listed in the Customer's Profile 17. If the next contact is not answered, is answered by a voice mail or answering machine, or is answered and the correct alarm notification cancel code is not entered, the Notification Engine 23 within the Interactive Messaging Server 18 leaves a message where applicable and the alarm event notification is sent to the central station monitoring facility 8 and the remaining contacts listed in the Customer Profile 17 are notified that alarm event was sent to the central station monitoring facility 8. This information is then stored in the Event Log 19 within the Database Server 16.

In the event of a fire or panic alarm event, the information is sent directly to the central station monitoring facility 8 and all of the customer contacts listed in the Customer Profile 17 are notified of the alarm event. The information is stored in the Event Log 19. There are no cancellation privileges associated with these events.

For an account that does not have central station monitoring, there are different workflows associated with non-critical, critical, panic, and fire events. In the event of a noncritical alarm, which represents a low battery event, AC Power loss, or other non-critical event, the information is sent to the customer's non-critical contact on the specified device, using the Notification Engine 23 within the Interactive Messaging Server 18. The results of this notification are stored in the Event Log 19 within the Database 16.

In the event of a critical alarm, the information is sent to the customer's first contact using the Notification Engine within the Interactive Messaging Server 18. The contact is given the option to cancel the alarm event or send the signal to the next contact listed in the Customer's Profile 17.

If the contact chooses to cancel the alarm event, the customer's notification cancel code is requested. If the correct alarm notification cancel code is entered, the alarm notification event and work flow process are cancelled and the results of the work flow process are stored in the Event Log 19. If the incorrect alarm notification cancel code is entered, the customer is requested to re-enter the alarm notification cancel code. If an invalid alarm notification cancel code is entered a second time, or no alarm cancellation code is entered, the work flow process moves to the next contact listed in the Customer's Profile 17 and the process is repeated. This work flow process will continue through all of the customer contacts until the alarm event is cancelled using the correct alarm notification cancel code. With each notification, the contact is given the information about the alarm event, including the name, address and system zone activated, as well as the police phone number to contact in the event of an emergency. During the process, the contact is given the option to have the notification sent to the next contact listed in the Customer Profile 17; given the option to cancel the notification; or be connected directly to the police phone number listed in his Customer Profile 17. In any case when a valid alarm notification cancel code is entered, the notification event and the workflow process are cancelled and the information is stored in the Event Log 19 within the Database Server 16. When an alarm notification is sent, if the line is busy or there is no answer by the first contact listed in the Customer Profile 17, the workflow process moves to the next contact listed in the Customer's Profile 17 to continue the work flow process.

In the same event, if the notification is answered by a voice mail or answering machine, the Notification Engine 18 recognizes that it is not a live person, leaves a message and the work flow process moves to the next contact listed in the Customer's Profile 17. If the next contact is busy, not answered, answered by a voice mail or answering machine, or answered and the correct alarm notification cancel code is not entered, the Notification Engine 18, leaves a message where applicable and moves to the next contact listed in the Customer's Profile 17. This process continues through all of the contacts listed in the Customer's Profile 17 until the correct alarm notification cancel code is entered to cancel the work flow process.

After the work flow process has attempted contact with all devices listed in the Customer's Profile 17, the Notification Engine 23 within the Interactive Messaging server 18 will try to send the alarm notification to those devices that were busy or where there was no answer to attempt to deliver the alarm event notification information.

In the event of a fire or panic alarm event, all of the customer contacts listed in the Customer Profile 17 are notified of the event and the results of the notification are stored in the Event Log 19 within the Database Server 16. There are no cancellation privileges associated with these events.

Confirmation that the alarm notification has been successfully transmitted to the customer's designated device(s) is housed in the event log and also in the Security or Premises Monitoring System. In a preferred embodiment, the IMN allows for a two-way communication interface with the base unit. In this way, the present invention allows for remote activation or resetting of the alarm and other devices in the home for security and home automation purposes, through the initiation of a phone call or global computer network transmission to the IMN. The IMN also allows the customer to preprogram alarm and home automation functions to initiate specific processes at specified times of the day.

The Information Management Network 2 can be programmed to forward certain alarm event transmissions directly to the central station monitoring facility 8 while other event transmissions are sent to the central station monitoring facility 8 only after the first, second, third or fourth transmission to the contacts listed in the Customer Profile 17.

Referring to FIG. 3 again, the account information in the Customer Profile 17 within the Information Management Network 2 can be populated by the customer or other authorized individual via a secure web interface on the Web Server 20 or via a secure telephone interface using the Telephony Server 11. To access their Customer Profile 17, customers are required to provide their personal user name and a unique personal pass code. Through these interfaces, authorized individuals can customize their personal account information to add, delete or modify their pre-designated contacts and designate the order of alarm event information transmissions to their contacts, modify their home address, phone number, police contact number, and billing information. Any change made to data within the Customer Profile 17 is automatically sent via PSTN or Internet interface to the central station monitoring facility 8 to update the customer's account information on a real time basis. This transfer of information applies only to those customers subscribing to central station monitoring services, which services serve as a complement to the alarm notification call flow process made by the Information Management Network 2.

What is claimed is:

1. An information management network system for routing information to one or more recipients, said network system comprising:
    a) means for receiving information from a monitoring system;
    b) one or more user profiles, each of the one or more user profiles comprising one or more specified notification contact data entries and a specified notification contact flow sequence;
    c) means for selecting a single user profile corresponding to the monitoring system and for retrieving the selected single user profile;
    d) means for extracting from the selected single user profile the one or more specified notification contact data entries and the specified notification contact flow sequence;
    e) means for identifying from each of the one or more notification contact data entries one or more communication receiving devices and for each such device a device-specific format, each of said communication receiving devices being configured both to receive messages in device-specific formats and to transmit a response message back to the information monitoring network;
    f) means for generating from the information received from the monitoring system and from each of the one or more notification contact data entries one or more interactive event notifications, each in a device-specific format corresponding to each of the one or more configured communication receiving devices;
    g) means for transmitting said one or more interactive event notifications in device-specific formats to each of the one or more configured communication receiving devices either sequentially or simultaneously according to the specified notification contact flow sequence;
    h) means for receiving from each of the one or more communication receiving devices, either sequentially or simultaneously according to the specified notification contact flow sequence, additional information or instructions containing specified subsequent actions to be taken by the network;
    i) means for altering the specified notification contact flow sequence according to the specified subsequent actions contained in the additional information or instructions received from each of the one or more configured communication receiving devices; and
    j) means for carrying out subsequent actions to be taken by the network according to the altered specified notification contact flow sequence.

2. The information management network system of claim 1 wherein the monitoring system is a premises monitoring system.

3. The information management network system of claim 1 wherein the information received from a monitoring system comprises an alarm or event notification.

4. The information management network system of claim 2 wherein the premises monitoring system is located remotely from the network system at a remote premises.

5. The information management network system of claim 1 wherein the user is a customer of an entity maintaining the information management network system.

6. The information management network system of claim 1 additionally comprising a premises monitoring system.

7. The information management network system of claim 1 additionally comprising
    a) one or more event logs corresponding to the one or more user profiles; and
    b) means for storing in the event log information comprising the information received from the monitoring system and information regarding the one or more interactive event notifications sent by the network.

8. The information management network system of claim 7 additionally comprising means for the user to access and retrieve information stored in the event log.

9. The information management network system of claim 1 additionally comprising:
    a) means for enabling a user to remotely access the user's user profile and the corresponding event log; and
    b) means for enabling the user, after having accessed the user's profile, to change the specified notification contact data entries and the specified notification contact flow sequence, thereby changing the order and manner in which event notifications are transmitted to the one or more configured communication receiving devices.

10. The information management network system of claim 9 wherein the means for enabling a user to remotely access the user's user profile and the corresponding event log is either a telephone interface or an internet interface.

11. The information management network system of claim 1 in which the one or more configured communication receiving devices to which interactive event notifications are directed are selected from the group: cell phone, e-mail, pager, land line phone, text messaging device, short messaging system, facsimile machine, and all combinations thereof.

12. The information management network system of claim 1 in which at least one of the one or more configured communication receiving devices is located at a staffed central station, and in which the device-specific format is a security industry data format, whereby the staffed central station is enabled to notify emergency authorities of the information received from the monitoring system.

13. The information management network system of claim 12 in which the staffed central station is enabled to send notification of an event to the user's home and to route a notification to the user at another location either concurrently with the notification to the home or sequentially.

14. The information management network system of claim 1 additionally comprising a means for voice telephone conferencing.

15. The information management network system of claim 1 additionally comprising means for sending out messages to users reminding them to update their user profiles.

16. The information management network system of claim 15 wherein the means for sending out messages to users comprises via email providing a link whereby to the web site for users can update their user profiles.

17. The information management network system of claim 15 wherein the means for sending out messages to users comprises a telephone interface, whereby the user is enabled to use the telephone key pad to update the user's user profile.

18. A method of routing information to one or more recipients comprising the steps of:

a) receiving information from a monitoring system;

b) storing one or more user profiles, each of the one or more user profiles comprising one or more specified notification contact data entries and a specified notification contact flow sequence;

c) selecting a single user profile corresponding to the monitoring system d) retrieving the selected single user profile;

e) extracting from the selected single user profile the one or more specified notification contact data entries and the specified notification contact flow sequence;

f) identifying from each of the one or more notification contact data entries one or more communication receiving devices and for each such device a device-specific format, each of said communication receiving devices being configured both to receive messages in device-specific formats and to transmit a response message back to the information monitoring network;

g) generating from the information received from the monitoring system and from each of the one or more notification contact data entries one or more interactive event notifications, each in a device-specific format corresponding to each of the one or more configured communication receiving devices;

h) transmitting said one or more interactive event notifications in device-specific formats to each of the one or more configured communication receiving devices either sequentially or simultaneously according to the specified notification contact flow sequence;

i) receiving from each of the one or more communication receiving devices, either sequentially or simultaneously according to the specified notification contact flow sequence, additional information or instructions containing specified subsequent actions to be taken by the network;

j) altering the specified notification contact flow sequence according to the specified subsequent actions contained in the additional information or instructions received from each of the one or more configured communication receiving devices; and carrying out subsequent actions to be taken by the network according to the altered specified notification contact flow sequence.

* * * * *

UNITED STATES PATENT AND TRADEMARK OFFICE
CERTIFICATE OF CORRECTION

PATENT NO.         : 6,829,478 B1
APPLICATION NO. : 09/714841
DATED                : December 7, 2004
INVENTOR(S)       : Pamela G. Layton et al.

Figure 4A:
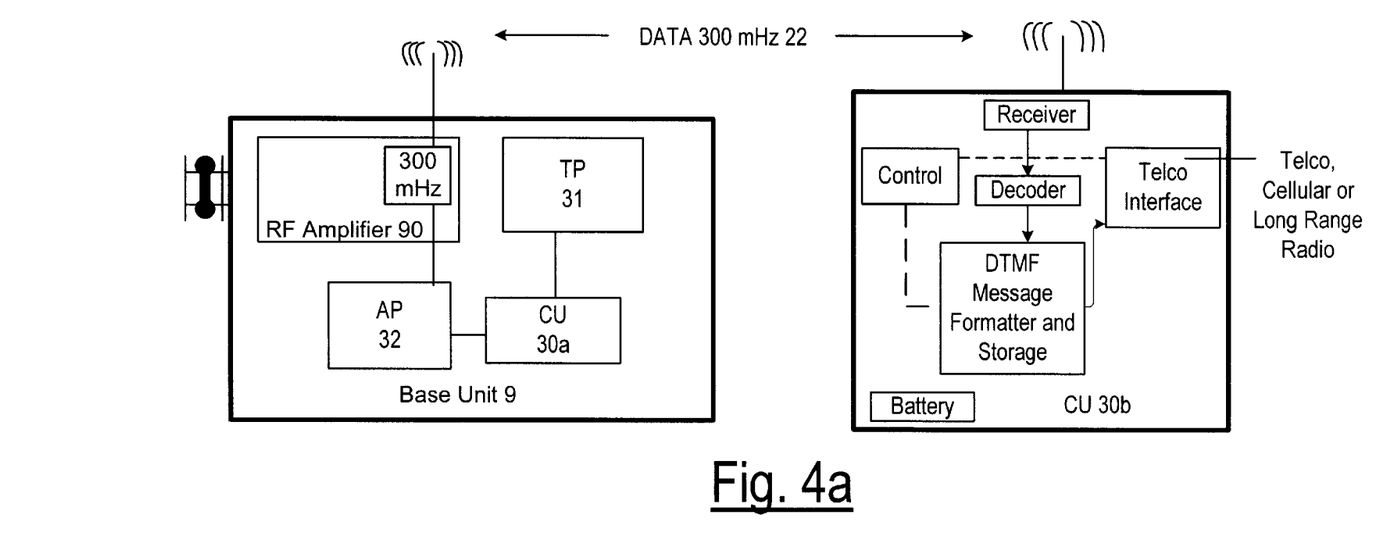
Figure 4B:
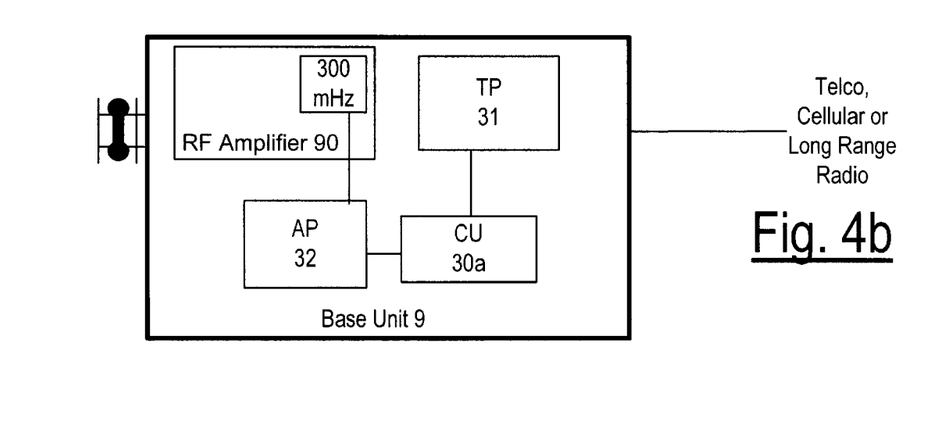

It is certified that error appears in the above-identified patent and that said Letters Patent is hereby corrected as shown below:

Delete Drawing Sheets 3 and 4 and please replace Figures 3, 4a and 4b with the attached Figures 3 and 4.

Signed and Sealed this

Twenty-sixth Day of May, 2009

JOHN DOLL
*Acting Director of the United States Patent and Trademark Office*

FIGURE 3

Figure 4.